Figure 1:
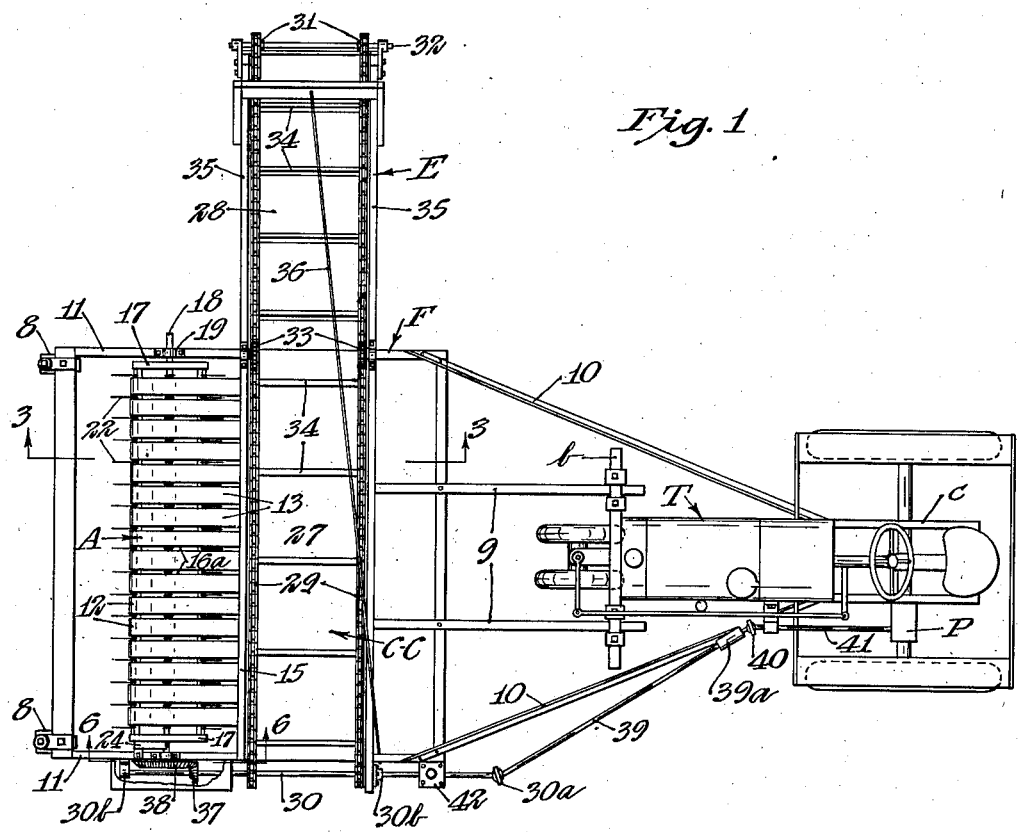

Sept. 12, 1939.   G. W. GALLAGHER ET AL   2,172,655
PICK-UP AND LOADING MACHINE FOR VINE CROPS
Filed Aug. 21, 1937   2 Sheets-Sheet 1

Inventors
George W. Gallagher
John G. Rietfort
By Williamson & Williamson
Attorneys Sept. 12, 1939. G. W. GALLAGHER ET AL 2,172,655
PICK-UP AND LOADING MACHINE FOR VINE CROPS
Filed Aug. 21, 1937 2 Sheets-Sheet 2
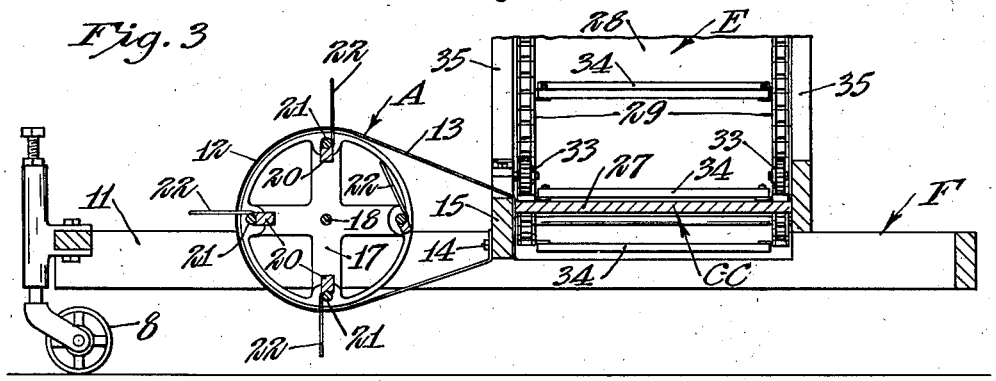
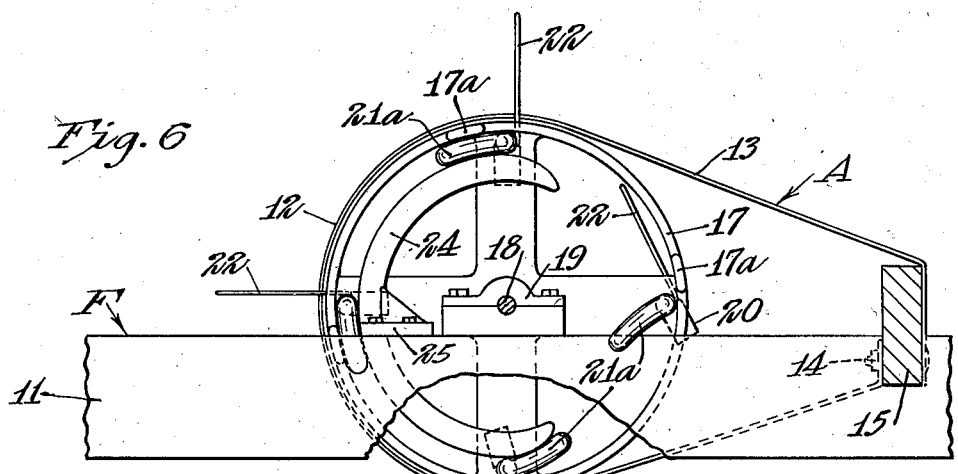
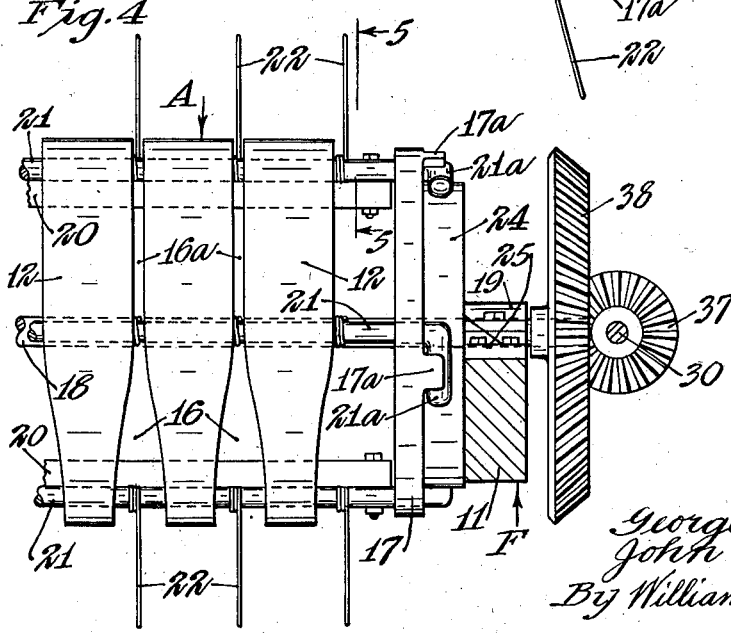
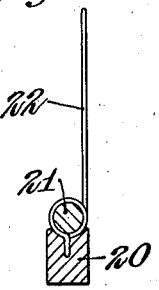
Inventors
George W. Gallagher
John G. Rietfort
By Williamson & Williamson
Attorneys Patented Sept. 12, 1939

2,172,655

UNITED STATES PATENT OFFICE 2,172,655

PICK-UP AND LOADING MACHINE FOR VINE CROPS

George W. Gallagher and John G. Rietfort, Waseca, Minn.

Application August 21, 1937, Serial No. 160,306

3 Claims. (Cl. 56—27)

This invention relates to pick-up and loading machines for harvesting vine crops, such as peas, beans, alfalfa, and the like.

In the harvesting and canning of peas and beans it is necessary to remove the crops from the ground within a few hours after they have been cut with the mower, to prevent depreciation of the value of the products. In sections of the United States where canning comprises a large industry, viner stations are located at different points and pea and bean vines are picked up as soon as possible after mowing and delivered to the closest station where the pods are picked, and, in the case of peas, the products are hulled from the pods.

It is the object of our invention to provide a comparatively simple, but highly efficient, picking and loading machine for vine crops, which will operate upon a relatively wide swath as it is moved over the ground, and which will quickly pick up and load the vines without injuring the pods, in the case of peas or beans, and without tangling or damaging in any way the vines themselves.

In most picking machines for vine crops the picking fingers have been caused to travel rearwardly and have been tripped or released from the vines during their rearward and upward travel. Such mechanism has failed to pick a large percentage of the vines which have been mowed, and has been objectionable in that the vines have often wound about the moving parts and become tangled with the fingers and driving means.

With our improved structure, the driving of the picker mechanism is reversed from that previously used and the picker elements engage the vines adjacent the ground line and then are moved forwardly and upwardly in a curved path, moving the vines over an arcuate forward apron section and then depositing the vines upon a declined apron section which is continuous with the forward section. The picker elements or fingers in our structure are tripped rearwardly as they enter the declined section of the apron, positively disengaging the vines from the underside to the end that there is no possibility of the vines becoming tangled with the picker elements, drum, or other moving parts.

It is a further object of our invention to provide a practical, commercial picker and loader of the class described, which may be readily associated with standard forms of tractors, as well as horse-driven vehicles and pushed forwardly of the vehicle for removing and collecting vines after they have been cut with the usual mower.

A still further object is the provision of a compact, efficient machine of the class described where all moving parts, including the picker mechanism and the conveyor and elevator, are driven from a single shaft which may in turn be driven from the power take-off of a tractor.

Figure 2:
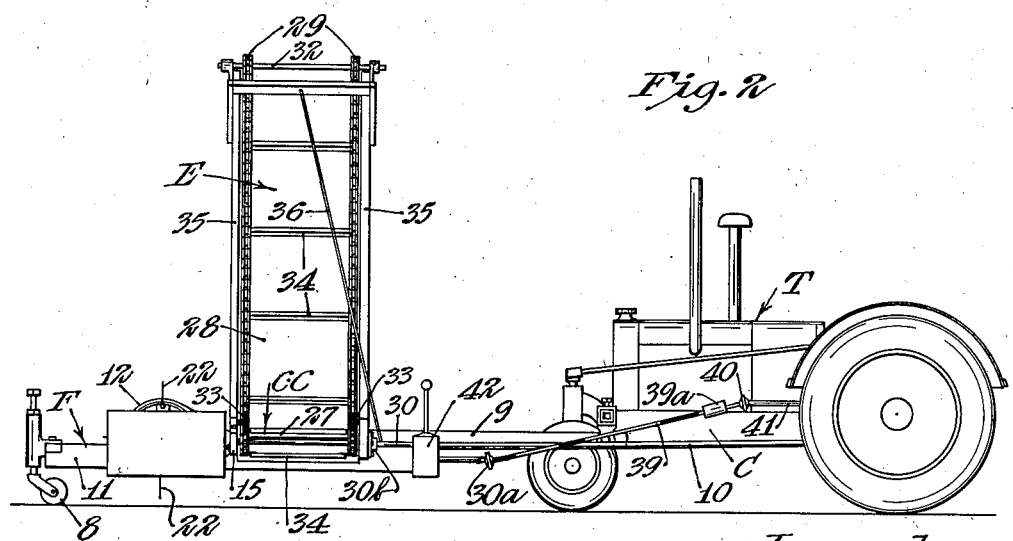

These and other objects and advantages of the invention will be more fully set forth in the following description made in connection with the accompanying drawings, in which like reference characters refer to similar parts throughout the several views, and in which:

Fig. 1 is a plan view of the embodiment of the device operatively attached to a tractor, Fig. 2 is a side elevation of the same, Fig. 3 is a vertical section taken approximately on the line 3—3 of Fig. 1, Fig. 4 is a fragmentary front elevation showing a portion of the forward apron section and picker mechanism, Fig. 5 is a detailed sectional view taken on the line 5—5 of Fig. 4, and Fig. 6 is a vertical section approximately on the line 6—6 of Fig. 1, showing the camming mechanism for tripping the picker elements.

As shown in the drawings, our improved pick-up and loading machine is associated with a four-wheel tractor T of conventional type, said tractor having the usual chassis frame c, which, as shown, supports at the forward end thereof, above the front wheels, a heavy crossbar b.

While illustrated as attached to a tractor, it will, of course, be understood that our improved machine is equally applicable for use with horse-driven vehicles, or as an attachment to a moving machine.

In the embodiment illustrated, a large horizontal, rectangular frame, indicated in its entirety by the letter F, is employed, supported at its front end, as shown, upon caster wheels 8, each located at one of the forward corners of frame F and supported at its rear end by rigid connection with the tractor frame. As shown, two heavy longitudinally-extending beams 9 of frame F are rigidly secured at their rear ends to the heavy cross-bar b of the tractor frame, while bracing-bars 10 rigidly connect the rear corners of frame F with the sides of the chassis frame of the tractor.

Our improved picker mechanism is mounted in the forward portion of frame F between the two side-members 11 of said frame. This picker mechanism includes an apron A, having a forward, semi-cylindrical portion 12, which, as shown, traverses most of the space between the side-members 11 of the frame, and having continued from that forward portion a declined flat section 13. In the form of the invention illustrated, the entire apron and its main supporting means are made up of a series of metal strips, spaced slightly apart in side by side relation and shaped to afford the arcuate or semi-cylindrical portions at the front of the picker mechanism, and the declined portions continuing from the top of said arcuate portions and extending rearwardly for some little distance. As shown, the continuous strips have upwardly inclined lower portions which are rigidly attached by means, such as the bolts 14, with a heavy cross-bar 15 of the frame structure. The inclined supporting portions of the said strips, as well as the lower parts of the forward arcuate sections of apron A, are narrowed in width, tapering from the medial part of the forward section to the narrowest portion which extends from a line vertically disposed below the axis of the semi-cylindrical section. This is done for the purpose of providing relatively wide, converging entrance slots 16 to guide and properly center the picker elements, as will later more clearly appear.

Within the apron A, and disposed concentrically of the arcuate forward section 12, our picker reel or drum is rotatably mounted. The picker drum illustrated comprises a pair of widely spaced heads in the form of wheels 17, having preferably heavy spokes and hub portions. Said heads are keyed, or otherwise rigidly affixed, to the ends of a shaft 18, which is journaled in suitable bearings 19, mounted, as shown, on the respective side beams 11 of frame F. A series (as shown four) of picker bars 20 are mounted between the two wheels or heads 17 of the drum, disposed in circumferentially spaced arrangement and being mounted for oscillation by means of rods 21, which are secured to bars 20, and which have their end portions journaled, as shown, in the outer spoke portions of the wheels 17, said ends of rods 21 extending through said spoke portions with their extremities at one end of the drum bent substantially at right angles to form guiding or camming arms 21a.

Each of said picker bar units, comprising one of the bars 20 and its rod 21, carries a series of spaced picker fingers 22, which may be constructed of any suitable material, such as heavy spring wire, and, as shown, said fingers are attached to the picker bar unit by having their inner ends wrapped spirally about rod 21 and the extremities of the rods or wire from which said pickers are constructed are deeply seated in the bar 20. The fingers of the several picker bars are spaced apart a predetermined distance, and this distance is such that the several series of picker elements may work through the slots 16a, defined by the opposing edges of the several strips making up apron A. As the picker fingers pass from the downward position, adjacent the ground line upwardly, they are guided and centered by the converging tapered portions 16 communicating with the narrow slots 16a.

A semi-circular cam 24 (see Figs. 4 and 6) is rigidly secured by supporting bracket 25 to one of the side beams 11 of frame F, and is disposed concentrically with the forward section 12 of apron A at one end of the drum and in the path of the guiding arms 21a of the picker rods 21. The ends of cam 24 extend slightly rearwardly of a vertical plane passing through the axis of the picker drum. As shown, the wheel 17 at the end of the drum, where cam 24 is mounted, is provided with a series of abutment lugs 17a, projecting laterally from the rim thereof, and one disposed above each of the guiding arms 21a to limit outward movement of that arm to a position where the picker fingers 22 are disposed substantially radially to the drum. Cam 24 is so constructed and associated with the drum and apron A that guiding arms 21a of the picker rods will follow the external camming surface with the pivoted ends of the arms leading, from a point slightly in advance of the vertical position of the picker fingers to a point some distance beyond the uppermost portion of the apron and where the fingers have entered to some extent the declined section 13 of the apron. Abutment means are provided for limiting the inward swinging movement of the picker fingers.

The declined section 13 of apron A delivers to a cross-conveyor C—C, which is supported across the rear portion of the heavy frame beams 11, this cross-conveyor being a part of and continuous with an inclined elevator E. The structure of the cross-conveyor C—C and elevator E illustrated, comprises a horizontal deck 27, extending from one side of the frame to the other and an inclined elevator deck 28, extending from the righthand end of the machine upwardly for a considerable distance. An endless conveyor in the form of a pair of spaced endless chains 29 is trained about two sets of sprockets, driving sprockets being fixed to a driving shaft 30 at the left side of the frame F and idler sprockets 31 being mounted on a shaft 32 at the upper end of elevator E. Conveyor chains 29 also pass beneath a pair of idler sprockets 33, disposed at the righthand side of the frame on a line where the elevator section of the conveyor begins. Endless chains 29 have attached therebetween a series of spaced conveyor slats 34 which scrape over the decks 27 and 28 of the cross-conveyor and elevator portions of the conveyor.

The elevator section E is supported from a pair of spaced, inclined beams 35, secured at their lower ends to the righthand side bar 11 of frame F and braced by suitable means, such as a bracing cable 36 attached to the upper portion of the conveyor and secured to the lefthand side frame bar 11.

The picker drum, as well as the endless conveyor comprising the endless chains 29 and spaced conveyor slats 34, are driven, as shown, from the single shaft 30, mounted in suitable bearings 30b affixed to the side of the lefthand frame member 11. Shaft 30 has affixed to the forward portion thereof a beveled driving pinion 37, which is in mesh with the beveled gear 38 affixed to the lefthand, outer end of shaft 18 of the picker drum. Shaft 30 is connected at its rear end by a universal joint 30a with a connecting shaft 39, which, in turn, is connected by a universal joint 40 with a short shaft 41 connected with the power take-off P of the tractor T. A transmission mechanism 42 is interposed between the shaft 30 and the universal joint 30a for the purpose of enabling several speed ratios to be obtained between the driving power and the driven shaft 30. A slip clutch mechanism 39a is interposed in the connecting shaft 39 to prevent damage to the power transmission mechanism and working parts in the event some obstruction gets into the power mechanism.

Operation

Our improved picking and loading machine is preferably pushed ahead of the tractor or other source of tractive power, and may follow the mowing machine as the vines are cut close to the ground. The frame F, it will be noted, is disposed a short distance above the ground level, with the picker mechanism adjacent the forward end thereof. The drum of the picker mechanism is revolved in a direction opposite to the rotation of the caster wheels 8 and the wheels of the tractor in their traveling movement. In the rotation of the picker drum, the several series of picker elements mounted on the picker bars 20 are caused, by the action of the semi-circular cam 24 upon the guide or camming arms 21a, to oscillate, as clearly shown in Figs. 3 and 6, into a position where the tips of the fingers engage the ground, the fingers extending substantially radially of the drum as they are brought into a downward vertical position. They are maintained in such radial position as they travel forwardly and upwardly through the slotted portions of the forward and semi-cylindrical apron section 12, engaging the vines and lifting the same forwardly and upwardly over said forward section 12 of the apron. It will be noted that the vines will be disposed forwardly of the picker fingers, in most instances being at least partially supported upon and scraped against the forward section 12 of the apron in the upward lifting movement of the mechanism. The vines, with the pods attached, are thus lifted and conveyed upwardly and rearwardly after the picking fingers 22 pass the horizontal plane of the axis of the picker drum, until they reach the forward portion of the declined apron section 13. There the momentum, as well as the subsequent throwing of vines behind them, cause the vines, with the assistance of gravity, to slide and be forced down the declined section 13 of apron A. The picker elements 22, working through the slots 16a of the apron after they have entered the declined portion 13 of the apron, are suddenly caused to swing forwardly away from the vines as rods 21 and the guiding or camming arms 21a leave the upper and rearward end of the semi-circular cam 24. This action takes place rather suddenly and the picker elements in one series retract quickly beneath the forward portion of the declined section 13 of apron A, leaving the vines free from interference upon said section and retracting in a forward direction so that there will be no chance of tangling with the vines, which at that point, and for a short period before, have been wholly supported upon the upper portion of the apron, rather than upon the picker fingers or tines themselves.

The picker elements, in retracted position, as shown in Fig. 6, travel with the drum until the guiding arms 21a forcibly strike the lower end of cam 24, causing the fingers 22 to be projected outwardly through the enlarged portions of the slots in the lower end of the apron, the rods 21 leading into the camming engagement outside of cam 24, and guiding arms 21a following said rods and maintaining the picker bars with the picker fingers thereon in the radial positions assumed during the picking cycle of our mechanism. As the picker fingers 22 engage the vines in their lowermost position and start their upward travel, they are guided and centered by the upwardly diverging or tapered slot 16 of the strip forming the apron, thereby being assured of registration with the relatively narrow slot 16a, extending from the horizontal center of the forward section 12 of the apron to the declined portion of apron 13.

The vines, with the pods attached, in the case of peas and beans of various varieties, through gravity and subsequent discharge of vines upon the declined section 13 of the apron, travel downwardly and fall upon the cross-conveyor section of the endless conveyor. The vines are moved by the slats 34 over the cross-conveyor deck 37 until they reach the elevator section E of the endless conveyor where they are moved upwardly by the same conveyor slats and dropped at the outer and upper end of elevator E, where they may be collected in a wagon or hopper for delivery to the viner station.

From the foregoing description it will be noted that in the entire picking and loading operations of our device there is no opportunity for the vines to be tangled with the picker fingers or other working elements of the conveyor and elevator. In the picking and lifting movement of the vines it will be noted that the fingers travel forwardly and upwardly around the semi-cylindrical section 12 of the apron, causing the vines to be partially supported by the apron after they pass a horizontal plane intersecting the axis of the drum and causing the vines, with the pods attached, to be wholly supported by the apron after they pass the uppermost position of apron A and before the picker elements are retracted by the trip mechanism. In such picking and elevating operation there is, therefore, no chance of bruising the pods or other products carried by the vines, nor is there any chance of tangling the vines or leaves with the operating mechanism, all of which, with the exception of the picker fingers, is disposed within or beneath the apron A.

It will further be seen that the frame F, supported at its forward end by the caster wheels 8 and its rearward end by the forward portion of the tractor, will follow the ground level, maintaining the lower periphery of the drum substantially parallel to, and slightly above, the level of the ground and thereby assuring a uniform and efficient engagement of the picker fingers with the vines.

From the foregoing description it will be seen that we have invented a high capacity, but nevertheless simple, picking and loading machine for vine crops, adapted to operate upon a relatively wide swath in its travel, and adapted to quickly pick up and load such crops after the vines have been cut with the mower.

It will, of course, be understood that various changes may be made in the form, details and arrangement of parts without departing from the scope of our invention.

Where hereafter in the appended claims the term "drum" is used, it is used in its broadest sense to include any rotatable body upon which picker elements can be attached.

What is claimed is:

1. In a pick-up and loading machine, a tractor, a pair of substantially parallel side frame elements extending forwardly of said tractor, a shaft journalled between said side frame members, drive connections between said tractor and said shaft to impart retrograde rotary movement to the shaft, a pair of spoked wheels rigidly secured adjacent the ends of said shaft, said wheels having circumferential rims connecting the ends of said spokes, rods journalled between oppositely disposed spoke ends of said pair of wheels, said rods having their ends bent at right-angles to their axes and said bent ends being curved on arcs of a circle concentric to said shaft, a pair of crescent shaped elements lying substantially within the circumference of said rims in spaced relation thereto and being rigidly secured to said side frame elements, a plurality of radially disposed picker fingers secured on said rods, and a plurality of spaced apron elements associated with said fingers.

2. The structure in claim 1 and said wheel rims each having lateral projections disposed adjacent to and outwardly from the bent ends of said rods.

3. In a pick-up and loading machine, a tractor, a pair of substantially parallel side frame elements extending forwardly of said tractor, a shaft journalled between said side frame members, drive connections between said tractor and said shaft to impart retrograde rotary movement to the shaft, a pair of wheels rigidly secured adjacent the ends of said shaft, rods journalled between oppositely disposed points on said pair of wheels, said rods having their ends bent at right angles to their axes and said bent ends being curved on arcs of a circle concentric to said shaft, a pair of crescent shaped elements lying substantially within the circumference of said rims in spaced relation thereto and being rigidly secured to said side frame elements, a plurality of radially disposed picker fingers secured on said rods, and a plurality of spaced apron elements associated with said fingers.

GEORGE W. GALLAGHER.
JOHN G. RIETFORT.